United States Patent [19]

Johnson et al.

[11] B 4,000,967

[45] Jan. 4, 1977

[54] WETTABLE NON-WOVEN STRUCTURES AND COMPONENTS THEREOF

[75] Inventors: Burnett H. Johnson; Terrence Huff, both of Baytown, Tex.

[73] Assignee: Exxon Research & Engineering Co., Linden, N.J.

[22] Filed: July 26, 1973

[21] Appl. No.: 372,232

[44] Published under the second Trial Voluntary Protest Program on March 16, 1976 as document No. B 372,232.

Related U.S. Application Data

[63] Continuation-in-part of Ser. No. 149,677, June 3, 1971, Pat. No. 3,765,948.

[52] U.S. Cl. .............................. 8/115.5; 162/146; 162/157 R; 264/83; 264/148; 264/184; 8/DIG. 9
[51] Int. Cl.² .......................................... D06B 1/00
[58] Field of Search ............... 8/115.5, DIG. 9; 162/182, 183, 184, 157 R, 158, 146; 264/82, 83, 184, 148; 136/146; 161/170

[56] References Cited

UNITED STATES PATENTS

| 2,869,435 | 1/1959 | Sands | 162/157 R |
|---|---|---|---|
| 3,016,599 | 1/1962 | Perry | 162/157 R |
| 3,067,087 | 12/1962 | Gorski et al. | 162/157 R |
| 3,228,744 | 1/1966 | Karn | 8/115.5 |
| 3,470,287 | 9/1969 | Landauer | 264/184 |
| 3,704,198 | 11/1972 | Prentice | 161/170 |
| 3,765,948 | 10/1973 | Johnson et al. | 136/146 |

FOREIGN PATENTS OR APPLICATIONS 952,111  3/1964  United Kingdom

*Primary Examiner*—S. Leon Bashore
*Assistant Examiner*—Peter Chin
*Attorney, Agent, or Firm*—David A. Roth

[57] ABSTRACT

A nonwoven mat of polyolefin fiber is contacted with a gaseous sulfur dioxide-chlorine mixture to sulfo-chlorinate the surface of the polyolefin fibers to a relatively high sulfur content and then preferably treated with an amine, either after compacting the mat or before compacting the mat to form a structure suitable as a battery separator. The mat can be used for other structures besides battery separators. And it can be separated into individually wettable staple fibers before compaction, i.e. individual separate fibers which are wettable.

15 Claims, 2 Drawing Figures

WETTABLE NON-WOVEN STRUCTURES AND COMPONENTS THEREOF

RELATED APPLICATIONS

This application is a continuation-in-part of Ser. No. 149,677, filed June 3, 1971 now U.S. Pat. No. 3,765,948.

BACKGROUND OF THE INVENTION

1. Field of the Invention

The present invention is directed to a process for producing rewettable mats, staple fibers, and articles such as battery separators from nonwoven mats of polyolefin fibers. More specifically, the present invention relates to the sulfo-chlorination of a nonwoven mat of polyolefin fibers and preferably the treatment thereof with an amine followed by recovery of individual fibers or compaction so that the compacted mat forms a useful structure such as one suitable as a battery separator which is rewettable, or one suitable as an adsorbtive liner for diapers.

2. Prior Art

The *Journal of Applied Polymer Science*, Vol. 16 (1972) at pp. 535–538, contains an article relating to chloro-sulfonation of polyethylene film. Furthermore, it is too late in time to be available as a reference, and also is not relevant, because it is directed to films, which require a different type of treatment.

Belgium Pat. No. 788,672, issued 2/1/73, discloses the use of high chloro-sulfonation levels for making staple fibers water dispersable. In addition, it is too late in time to be available as a reference for mats.

British Pat. No. 952,111 is directed to producing a chemically active solid polyolefin surface, e.g., films, to which adhesives, dyes, inks and coatings in general will adhere, and which have little tendency to pick up static charge. The procedure described comprises exposing the polyolefin surface to a mixture of gaseous sulfur dioxide and chlorine in the presence of ultraviolet light to thereby form very small quantities of sulfochloride groups and reacting these sulfochloride groups at the surface of the polymer with a reagent selected from the class consisting of ammonia, monomines, polyamines, monohydric alcohols, polyhydric alcohols, alkylene oxides and aqueous alkali metal hydroxides.

The melt-blown processes used to make the porous non-woven mats which are then treated according to the invention are described in several issued patents such as Prentice, U.S. Pat. Nos. 3,704,198 and 3,650,866, which are incorporated herein by reference.

SUMMARY OF THE INVENTION

The present invention is directed to a process for producing wettable, porous mats, which can be used as is, detached into individual staple fibers, or subsequently compacted to form articles. The process comprises contacting a nonwoven mat or polyolefin fibers having a porosity greater than 40 percent with a gaseous sulfur dioxide-chlorine mixture in the presence of fluorescent light under conditions to obtain at least 0.35, preferably at least 0.5 and most preferably 1 percent sulfur in the nonwoven mat. And, then for most applications treating the mat with an amine for sufficient time and in sufficient concentration to obtain in the case of compacted articles 90 percent wettability in 20 minutes in a sulfuric acid solution.

More specifically, the present invention is directed to a process for producing a wettable loose-fibered mat or a compacted rewettable article, such as a battery separator from a non-woven mat of polyolefin fibers, preferably produced by a melt-blowing (M-B) process, which M-B process comprises extruding the polyolefin such as polypropylene through a die into a heated air stream which attenuates the fibers to produce fine fibers (1 to 10 microns in diameter) and collecting these fibers on a moving screen in the form of a mat, by first contacting the mat with a gaseous sulfur dioxide-chlorine mixture and then treating the mat with an amine, preferably a polyamine.

DESCRIPTION OF THE PREFERRED EMBODIMENT

Figure 1:
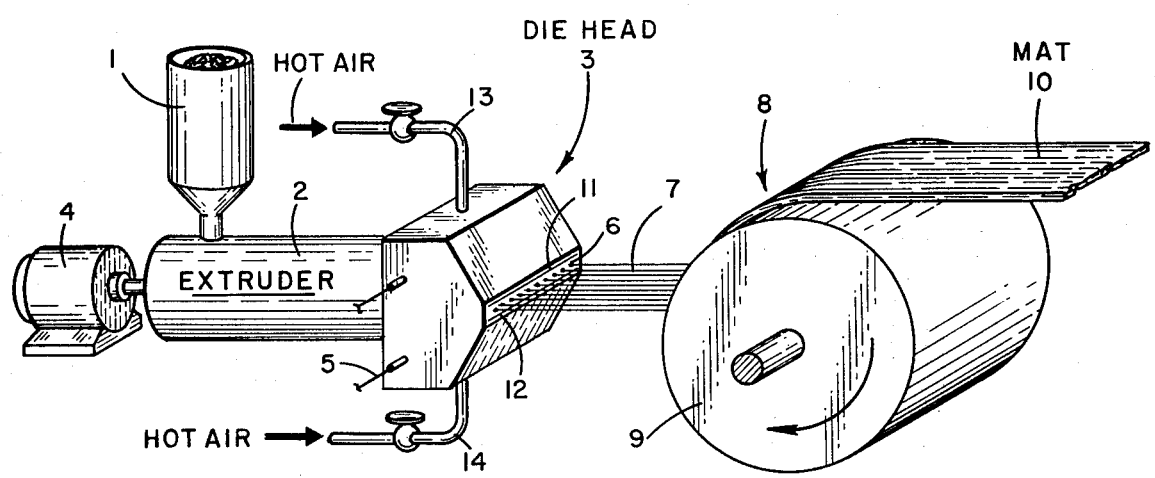
FIG. 1 is a schematic view of the overall melt-blowing process.

Referring to FIG. 1 of the drawings, a polyolefin specifically illustrated by polypropylene which, is preferred, is introduced into a pellet hopper 1 of an extruder 2. The polypropylene used in the present invention has either been thermally treated before being intorduced into the extruder 2 or is thermally treated in the extruder 2 and/or die head 3. According to the present invention, the polypropylene is added into the hopper 1 and then is heated in extruder 2 at temperatures in excess of 600° F. and preferably within the range of 620° to 800° F. After thermal treatment, the polypropylene is forced through the extruder 2 by a drive motor 4 into the die head 3. The die head 3 may contain a heating plate 5 which may also be used in the thermal treatment of the polypropylene before it is melt-blown. The polypropylene is then forced out a row of die openings 6 in the die head 3 into a gas stream which attenuates the polypropylene into fibers 7 which are collected on a moving collecting device 8 such as a drum 9 to form a continuous mat 10. The gas stream which attenuates the polypropylene is supplied through a gas jet 11 and 12, respectively. These gas slots 11 and 12 are supplied with a hot gas, preferably air, by gas lines 13 and 14, respectively.

Figure 2:
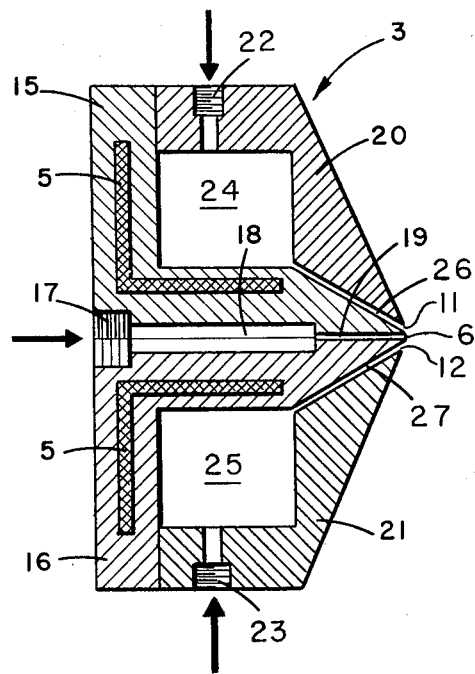
FIG. 2 is a cross-sectional view of a die.

The melt-blowing process may be further understood by considering the details of the die head 3 which is set forth in cross-section in FIG. 2. The polypropylene is introduced into the back of the die plates 15 and 16 through an inlet 17. The polypropylene then goes into a chamber 18 between the upper and lower die plates 15 and 16, respectively. The facing of the die plate 16 has milled grooves 19 which terminate in the die openings 6. It is understood, of course, that the mill grooves may be in the lower die plate 16, in the upper die plate 15, or grooves may be milled in both plates 15 and 16. An upper gas cover plate 20 and a lower gas cover plate 21 are connected to the upper die plate in lower die plate 15 and 16, respectively. The hot gas is supplied by inlets 22 in upper air plate 20 and lower inlet 23 in lower gas plate 21. Suitable baffling means (not shown) may be provided in both the upper air chamber 24 and lower air chamber 25 to provide a uniform flow of air through the gas slots 26 and 27, respectively. As shown in FIG. 2, the rear portion of the die head 3 may contain heating means 5 for heating both the polymer and air in the die head 3.

The gas flow is controlled so that the fibers as they are attenuated do not come into contact one with the other which results in "rope" and fiber bundles. The gas, preferably air, is heated and the flow controlled to produce very fine fibers (less than 10 microns). Suitable polypropylene mats have been obtained at air rates between 0.7 and 4 pounds/minute and the polypropylene fibers are attenuated in the gas stream at those rates such that their average diameter is between 1 to about 10 microns.

The fibers are collected as a self-supporting mat on a collecting device such as a rotating drum at distances of about 1 to 18 inches from the die openings. Preferably a mat of self-bonded fibers is collected at a distance between 3 to 8 inches. A "self-bonded" mat as used herein means that the mat is a coherent, integral structure capable of withstanding normal handling such as winding, unwinding, cutting, pressing, calendering, etc., without losing its essential mat-like character. In most mats used in the present invention, some thermal bonding occurs. The mat produced by the melt-blowing process is produced so as to have a basis weight of between 60 and 500 grams/square meter. The thickness of the non-woven mat may vary between 20 and 200 mils.

To produce many structures such as a battery separator, laminates (such as those described in U.S. Pat. Nos. 3,715,251; 3,704,198; 3,650,866), cable wrap, capacitor paper, synthetic paper, filters, etc., from the nonwoven mat produced by the melt-blowing process, the mat must be compacted to obtain the desired thickness and porosity as well as the mechanical properties of strength and abrasion resistance. The nonwoven mat is compacted to a thickness of between 10 and 40 mils to be useful as a battery separator in most batteries. Compacting is preferably carried out by a thermal compacting operation utilizing calendar rolls or a press to obtain a non-woven mat of fixed thickness.

It has been found, according to the present invention, that the compacted non-woven mat of polyolefin fibers may be made wettable, as well as rewettable, by a sulfuric acid solution (may vary in concentration between 35 and 40 weight percent) by contacting the mat first with a sulfur dioxide-chlorine gaseous mixture and thereafter treating with an amine. The contacting step with the gaseous sulfur dioxide-chlorine mixture is carried out for about three minutes with a fluorescent light source at temperatures from 0° C. to about 130° C. employing ratios of sulfur dioxide to chlorine generally from 10:1 to 1:2, preferably 5:1 to 1:1.

This reaction of the sulfur dioxide and chlorine is catalyzed by a source of ultraviolet radiation such as a fluorescent light, although the reaction may be carried out more rapidly with a stronger light source such as a mercury lamp. The light source is placed within about 6 inches from the non-woven mat, and preferably within about three inches therefrom.

It has been found according to the present invention that the treatment with the sulfur dioxide-chlorine mixture requires that at least one percent sulfur be obtained in the non-woven mat so as to obtain the desired wettability by the sulfuric acid solution acting on a compacted mat. Accordingly, the specific conditions under which the non-woven mat is contacted may vary provided that at least 1 percent sulfur in the compacted mat is obtained. It is to be noted that a feature of this invention is that non-woven mats which are not to be subsequently compacted can be made water wettable and water rewettable at a somewhat lower minimum sulfur level, e.g. at least 0.35, preferably at least 0.5 per cent of sulfur (all percentages are weight percentages unless otherwise indicated).

After the non-woven mat has been sulfo-chlorinated by the contacting step, the non-woven mat is then treated with an amine, preferably a polyamine. A polyamine is preferred since after complete reaction with the sulfonyl-chloride functionality it may be used in lower molar concentration to obtain the desired high concentration of nitrogen in the non-woven mat. To illustrate the effect of molar concentration in the reaction of an amine with the sulfonyl-chloride, an amine such as tetraethylene pentamine provides five nitrogen atoms per molecule of sulfur whereas ammonium hydroxide provides only one nitrogen atoms per molecule of sulfur. Amines such as ethylene diamine, diethylene triamine, triethylene tetraamine, as well as ammonium hydroxide or a monoamine, may be used in the present invention. However, if ammonium hydroxide or a monoamine is used the amount of sulfur in the sulfochlorinated treated mat must be increased over one percent, or over 0.35 and 0.5 wt. % as the case may be.

The reaction of the amine with the sulfo-chlorinated treated mat occurs quite rapidly. The treating of the mat with the amine may be carried out by spraying the mat with an amine in an aqueous solution. If sprayed, the concentration of the solution may be between 5 and 100 volume percent, and preferably between 40 and 60 volume percent. The treatment may also be carried out by dipping the sulfo-chlorinated non-woven mat in the amine or an aqueous amine solution.

The compacting operation of the non-woven mat to produce the desired structure, such as battery separator, laminate, cable wrap, capacitor tissue, etc., may be carried out either before the contacting thereof with the sulfur dioxide-chlorine mixture and the treatment with the amine or after it has been contacted and treated so as to obtain a fixed desired thickness.

The compacting operation is preferably a continuous operation such as by use of calender rolls but also may be carried out in a batch-type pressing operation. To obtain the fixed thickness, a shim or spacer may be used between the pressing plates or calender rolls, or the required pressure to obtain the fixed thickness may be determined.

In producing a battery separator, an embossed pattern or rib may be pressed into the non-woven structure to obtain battery separators with a desired design configuration. The embossing or the forming of ribs may be carried out at the same time the nonwoven mat is pressed to the fixed thickness in the compacting operation.

Particularly preferred battery separator structures are described in Ser. No. 267,325 filed 6/19/72, now U.S. Pat. No. 3,811,957 which is hereby incorporated by reference in its entirety.

In order to achieve low electrical resistance, for situations where the compacted structures will be used in environments where their electrical properties are important, a high percent porosity in the compacted non-woven structures is required. For any non-woven structure of given fiber size, increasing percent porosity also increases maximum pore size because the distance between adjacent fibers increases. An effective way to decrease pore size at a high percent porosity is to decrease the fiber size in the non-woven structure. By forming the same weight of polyolefin into very small fibers and randomly distributing these fibers, the fiber-to-fiber distance is reduced and thus smaller pores are obtained. The very small fiber sizes (0.5 to 30 microns, preferably 0.5 to 10 microns) utilized in the preferred embodiment thus make possible the combination of low electrical resistance and small pore size in the non-woven structure. (Fiber size refers to diameters.)

Moreover, the small fibers from a melt-blown process are relatively short and can be considered as staple fibers.

Although wettable synthetic paper can be prepared by compacting the loose mat after sulfo-chlorination, another feature of this invention is that the loose mat, after sulfo-chlorination is subjected to physical shearing, i.e., beating to separate the fine stable fibers.

These can be dispersed in an aqueous medium along with 10 to 90, preferably 50 to 90, and most preferably 50 to 70 wt.% of cellulose fibers based on total fiber dispersed. This mixture of cellulose and polyolefin fibers in aqueous dispersion can then be processed into paper or sheets utilizing conventional equipment such as paper handling equipment.

Alternatively, the cellulose fiber component can be eliminated or replaced with other types of synthetic staple fiber in order to produce novel paper-like non-woven sheets having unusual properties.

The sheet made from the aqueous slurry can be compressed suitably to increase the bonding of the fibers therein to produce paper or nonwoven articles of improved strength and tear resistance.

Although polypropylene is the preferred polyolefin, other polyolefins such as polyethylene, polybutene, polypentene, polystyrene, combinations thereof, combinations with comonomers, and blends with other materials can also be used in the invention.

Melt-blown non-woven mats are preferred but other non-woven mats can be used.

The present invention will be further illustrated by the following specific examples which are given by way of illustration and not as limitations on the scope of the invention.

EXAMPLES 1-14

Polypropylene non-woven mats produced by melt-blowing polypropylene into a mat and then compacted were treated with a gaseous sulfur dioxide-chlorine stream (5.2 mmoles each/min., premixed) under the influence of a 22 watt circular fluorescent light mounted exterior to the pyrex reaction vessel. The fluorescent light source is based on a low pressure mercury vapor resonance lamp, modified by coating the inner glass thereof with substances which adsorb the short wavelength mercury lines and readmit the light quantity at longer wavelengths. This causes a light emission in the wavelengths of about 3,800 to 7,000 A. This is a preferred range. The resultant chlorosulfonated polypropylene non-woven mats were treated with two levels of aqueous tetraethylene pentamine (50 and 5 volume percent) and concentrated aqueous ammonium hydroxide to convert surface sulfonyl chloride groups to sulfonamide-polyamine and sulfonamide groups respectively.

The polypropylene non-woven mats before treatment were composed of polypropylene fibers having diameters between 1 and 10 microns and a maximum pore size less than 25 microns. The non-woven mats were not wettable using as the test floating a dry, 2 inch × 2 inch square of battery separator sample on a 40 weight percent aqueous sulfuric acid solution and measuring the time for specific percentages of the top of the sample to wet by wicking action. After treatment according to the present invention, the battery separators are wettable by a sulfuric acid solution which may vary in concentration between 35 and 40 percent by weight better than 90 percent in 20 minutes. Wettability obtained on various samples as well as appropriate base cases is set forth in the following Table I.

TABLE I

| Sample No. | Min. SO$_2$ - Cl$_2$ Treat. | After Treatment | % S | % Cl | % N | Time (min.) | % Wet (40% H$_2$SO$_4$) |
| --- | --- | --- | --- | --- | --- | --- | --- |
| (1) | 0.5 | Spray with 50 vol. % TEPA*, dry | 0.09 | 0.37 | 0.46 | 60 | None |
| (2) | 1.0 | in 60°C vac. oven overnight, | 0.21 | 0.70 | 0.93 | 60 | 3 |
| (3) | 2.0 | water wash ~ 3 hrs., dry | 0.78 | 1.42 | 1.32 | 20 | 55 |
| (4) | 4.0 | " | 1.23 | 2.37 | 2.42 | & 0.4 | 95 |
| (5) | 5.0 | " | 1.27 | 2.40 | 2.57 | 0.03 | 100 |
| (6) | None | " | 0.01 | 0.02 | 0.13 | & 60 | None |
| (7) | None | Spray with 5 vol. % TEPA*, dry | 0.03 | 0.10 | 0.08 | 20 | None |
| (8) | 2 | in 60°C vac. oven overnight, | 1.1 | 4.5 | 0.27 | 20 | & 90 |
| (9) | 4 | water wash ~ 3 hrs., dry | 1.4 | 6.2 | 0.06 | 20 | 1.0 |
| (10) | 5 | " | 1.5 | 5.6 | 0.04 | 20 | 1.5 |
| (11) | 15 | " | 2.0 | 8.4 | 0.14 | 20 | 99.5 |
| (12) | 10 | " | 1.8 | 6.5 | 0.03 | 20 | 98 |
| (13) | 15 | Dip in conc. NH$_4$OH for > 48 | 1.9 | 6.2 | 0.78 | 20 | 80 |
| (14) | None | hrs., water wash ~ 3 hrs., dry | | | | 60 | & None |

*Tetraethylene pentamine.

As set forth in the above Table I, the spray treatments were with aqueous solution. The mats were dried overnight as a matter of convenience, then washed in a flowing stream of water and dried at 60° C. in a vacuum (1 mm Hg) for 24 hours or greater before testing by the test set forth hereinabove for wettability. The time and percentage of area wetted are set forth in the last two columns of Tabe I.

It is illustrated by comparing samples 1-6 with samples 7-12 the effect of concentration of a specific amine when sprayed on the completeness of reaction with the sulfonyl chloride groups of the surface of the fibers in the non-woven mat.

Polysulfonic or carboxylic acid salt functionality would also impart acceptable wettability. But, even this functionality is preferably attached through a sulfonamide linkage.

That is to say, the importance of reacting the amine with the sulfochlorinated group is to remove the Cl atom and replace it through a sulfonamide linkage with polar functionality which is water-wettable as spelled out above.

The nature and object of the present invention having been completely described and illustrated and the best mode thereof contemplated set forth, that we wish to claim as new and useful and secure by Letters Patent is:

1. An improved process for preparing wettable and rewettable polyolefin non-woven mats which comprises:
   contacting a non-wettable non-woven mat of polyolefin fibers having a porosity greater than 40 percent with a gaseous sulfur dioxide-chlorine mixture in the presence of ultraviolet light under conditions to obtain at least 1.0 weight percent sulfur in said mat.

2. A method according to claim 1 wherein after contacting with said gaseous mixture, said mat is treated with an amine for sufficient time and in sufficient concentration to obtain 90 percent wettability in 20 minutes in a sulfuric acid solution.

3. A process according to claim 1 wherein said non-woven mat is compacted to form a rigid structure having a maximum pore size of less than 40 microns before contacting said non-woven mat with said sulfur dioxide-chlorine mixture.

4. A process according to claim 2 wherein said non-woven mat is compacted to form a rigid structure having a maximum pore size of less than 40 microns after treating said mat with an amine.

5. A process according to claim 1 wherein said non-woven mat is made of polypropylene fibers.

6. A process according to claim 1 wherein said non-woven mat is contacted for at least 3 minutes with about a 50—50 mixture of sulfur dioxide and chlorine.

7. A process according to claim 2 wherein said mat is sprayed with a polyamine of at least 10 volume percent.

8. A process according to claim 2 wherein said amine is tetraethylenepentamine.

9. A process according to claim 1 wherein said mat is comprised of individual staple fibers having a diameter of 0.5 to 30 microns and was prepared from a melt-blowing process.

10. A process according to claim 9 wherein said fibers are polypropylene.

11. A process according to claim 2 wherein said mat is composed of individual staple fibers having a diameter of 0.5 to 30 microns and was prepared from a melt-blowing process.

12. A process according to claim 9 wherein individual staple fibers are separated from said mat.

13. A process according to claim 11 wherein individual staple fibers are separated from said mat.

14. A process according to claim 13 wherein said individual fibers are dispersed in a water slurry and subsequently processed in standard paper making equipment.

15. A process according to claim 14 wherein said polyolefin is polypropylene.

* * * * *